(12) United States Patent
Stanfield et al.

(10) Patent No.: US 8,181,745 B1
(45) Date of Patent: May 22, 2012

(54) OIL FILTER RELOCATION KIT APPARATUS AND METHOD

(76) Inventors: Robert E. Stanfield, Doland, SD (US); Kory D. Farstad, Huron, SD (US)

( * ) Notice: Subject to any disclaimer, the term of this patent is extended or adjusted under 35 U.S.C. 154(b) by 463 days.

(21) Appl. No.: 12/402,545

(22) Filed: Mar. 12, 2009

(51) Int. Cl.
*F01M 11/04* (2006.01)

(52) U.S. Cl. .......................................... 184/1.5

(58) Field of Classification Search ............... 184/1.5, 184/6.24; 123/196 A
See application file for complete search history.

(56) References Cited

U.S. PATENT DOCUMENTS

| | | | |
|---|---|---|---|
| 3,945,463 A * | 3/1976 | Okano et al. | 184/6.13 |
| 4,492,632 A * | 1/1985 | Mattson | 210/167.05 |
| 4,690,236 A * | 9/1987 | Shinozaki et al. | 180/219 |
| 4,901,693 A | 2/1990 | DeGrazia | |
| 5,085,188 A | 2/1992 | Gasparri | |
| 5,090,376 A | 2/1992 | Bedi | |
| 5,244,036 A * | 9/1993 | Michl | 165/300 |
| 5,298,158 A | 3/1994 | Anderson | |
| 5,433,177 A * | 7/1995 | Suzuki | 123/73 AD |
| 5,653,206 A * | 8/1997 | Spurgin | 123/196 AB |
| 5,715,778 A * | 2/1998 | Hasumi et al. | 123/41.51 |
| 5,853,575 A * | 12/1998 | Wydra et al. | 210/136 |
| 5,887,561 A | 3/1999 | Spurgin | |
| 5,901,808 A | 5/1999 | Swenson | |
| 5,924,195 A * | 7/1999 | Guadagni | 29/888.011 |
| 6,328,132 B1 * | 12/2001 | Zager | 184/1.5 |
| 7,021,267 B2 * | 4/2006 | Kawakubo et al. | 123/196 R |
| 7,156,067 B1 * | 1/2007 | Gottschalk | 123/198 DB |
| 7,228,837 B2 * | 6/2007 | Smith | 123/196 R |
| 7,300,581 B2 | 11/2007 | Seipold | |

* cited by examiner

*Primary Examiner* — Michael Mansen
*Assistant Examiner* — Michael Riegelman
(74) *Attorney, Agent, or Firm* — Jeffrey A. Proehl; Woods, Fuller, Shultz & Smith, P.C.

(57) ABSTRACT

An oil filter relocation kit for a motorcycle, comprising an oil block to attach to the oil transfer fitting of the engine. The oil block has an input port and an output port configured to fluidly communicate with the oil transfer fitting. A bracket is configured to mount on the frame of the motorcycle. A filter interface is attachable to the bracket to support the filter interface on the frame. The filter interface has an oil inlet port and an oil outlet port. A plurality of fluid conduits are configured to couple the input port and the output port of the oil block to the oil inlet port and the oil outlet port of the filter interface to place the filter interface in fluid communication with the oil block and the oil filter in fluid communication with the engine.

18 Claims, 6 Drawing Sheets

OIL FILTER RELOCATION KIT APPARATUS AND METHOD

BACKGROUND

1. Field

The present disclosure generally relates to filtering systems and more particularly pertains to a new oil filter relocation kit, apparatus and method for beneficially repositioning a motorcycle oil filter on the motorcycle.

2. Description of the Prior Art

Oil filters are used to remove suspended impurities from engine oil, both enhancing the performance of and increasing the serviceable life of an engine. An oil filter receives unfiltered oil from an engine, filters suspended impurities from the oil, and releases filtered oil back into the engine. When used with engines designed for compact environments, such as those used in motorcycles, oil filters are generally positioned so that the location of the filter does not interfere with an operator or with other engine components. Frequently, oil filters are attached directly to the engine or to a filter housing, which is in turn attached to the engine.

The efficiency of an oil filter degrades over time, as filtering elements in the filter become clogged with particles extracted from the oil. It is customary to perform oil changes on a periodic basis, in which dirty oil is removed from the oil reservoir of an engine and replaced with clean, fresh oil. In the oil change procedure, oil filters are typically replaced.

Unfortunately, the process of performing an oil change, including replacement of the oil filter, requires an operator to interact with dirty components in tight quarters. Oil filters are typically cylindrical canisters that gather debris and oil as they are attached to a vehicle. The debris and oil make the filter difficult to grip, particularly when the filter is in a confined location.

Specifically, the oil reservoir of some engines may be located at a vertical height that is higher than the vertical height of the oil filter. In these types of configurations, removing the oil filter from its filter housing results in a spillage of oil, as the fluid flows from the engine through the housing and into the surrounding environment. Although an engine is typically drained of oil prior to replacement of the filter, residual oil remaining in the engine, the oil reservoir and the housing itself is often released into the environment when the filter is removed.

In some situations, it is desirable for an operator to install and accessory oil cooler on a motorcycle in order to provide additional oil cooling capacity. Placement of an accessory oil cooler forward of the engine of a motorcycle is desirable to maximize air flow against the cooler, thereby increasing its cooling ability. However, the presence of components external to the engine at a position forward of the engine often prevents an operator from installing an accessory oil cooler in this desirable location.

Therefore, there is a need for a system that diminishes the oil spillage problem that can be encountered while changing oil in vehicles such as motorcycles, as well as allowing for the use of an accessory oil cooler on the motorcycle.

SUMMARY

In view of the foregoing disadvantages inherent in the known types of filters now present in the prior art, the present disclosure describes a new oil filter relocation kit, apparatus and method which may be utilized for beneficially repositioning a motorcycle oil filter on the motorcycle.

The present disclosure relates to an oil filter relocation kit for repositioning an oil filter on a motorcycle. The motorcycle has a frame comprising a plurality of frame elements, an engine mounted on the frame and having an oil transfer fitting defining an oil inlet and an oil outlet. The engine may have a filter housing for mounting on the oil inlet and the oil outlet of the engine, and the filter housing may have an input and an output. The kit includes an oil block configured to attach to the oil transfer fitting of the engine in place of the filter housing when the filter housing is removed from the engine. The oil block has an input port and an output port configured to fluidly communicate with the oil inlet and oil outlet of the engine when the oil block is attached to the engine. The kit also includes a bracket configured to mount on the frame of the motorcycle at a location remote from the oil transfer fitting of the engine. The kit also includes a filter interface configured to attach to the bracket to thereby support the filter interface on the frame when the bracket is mounted on the frame of the motorcycle. The filter interface is configured to have the filer housing mounted thereon, the filter interface having an oil inlet port and an oil outlet port. The kit also includes a plurality of fluid conduits configured to couple the input port and the output port of the oil block to the oil inlet port and the oil outlet port of the filter interface to place the filter interface in fluid communication with the oil block so that when the oil block is mounted on the oil transfer fitting of an engine and a filter is mounted on the filter interface, the filter is in fluid communication with the engine.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components and the particulars of the steps set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new oil filter relocation kit, apparatus and method of implementation that embody the principles and concepts of the disclosed subject matter will be described.

Figure 1:
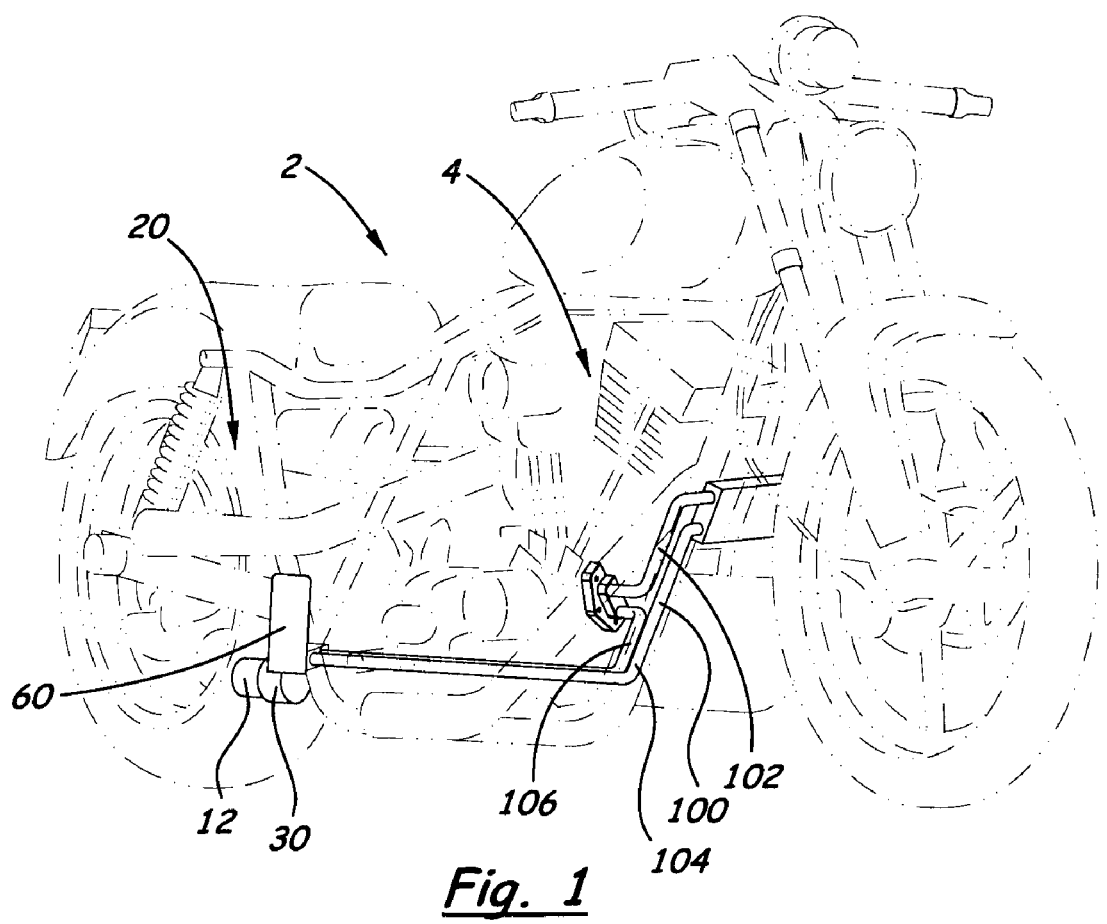
FIG. 1 is a schematic perspective view of the oil filter relocation kit mounted on a motorcycle.

The disclosure relates to an oil filter relocation kit 10 that is useful for repositioning an oil filter 12 on a motorcycle 2 from the original or stock position of the filter, as best shown in FIG. 1. The motorcycle 2 may have a frame 20 comprising a plurality of frame elements, with a first side which may correspond to the left side of a rider straddling the cycle and a second side which may correspond to the right side of the rider straddling the cycle. A kickstand may be located on the first side of the frame 20, for supporting the motorcycle 2 in a substantially vertical orientation when no rider is occupying the vehicle. When resting on the kickstand, the frame 20 of the motorcycle 2 may lean in the direction of the first side. Generally, the elements of the present disclosure may be suitable for use on motorcycles which have a frame structure that includes a pair of triangular frame elements that act as a seat support frame element 22, mounted in a parallel configuration behind and above an engine cavity, although the elements may be implemented on other types and configurations of cycles. The kit 10 is suitable for use with motorcycles of the type referred to as "bagger-style", although the invention is not limited to this particular motorcycle application. Illustratively, motorcycles of this type include the 1999-2006 model years of the Harley-Davidson Evolution or Twin Cam series Road King or Electra Glide motorcycles, although again the application of the kit 10 is not so limited.

An internal combustion engine 4 may be mounted on the frame 20 in the engine cavity. The engine 4 may contain a quantity of oil for lubricating and cooling internal engine components, and the oil may be situated in a sump in the bottom of the crankcase. The engine 4 may have an oil transfer fitting 6 having an oil inlet 7 that defines a passage for (filtered) oil to be directed into the engine 4 and an oil outlet 8 that defines a passage for (unfiltered) oil to be directed out of the engine 4 and to the oil filtering apparatus for the engine. The oil inlet passage 7 and the oil outlet passage 8 may be located near each other on the engine, and are generally in fluid communication with an oil filter 12 of an oil filtering apparatus.

Figure 7:
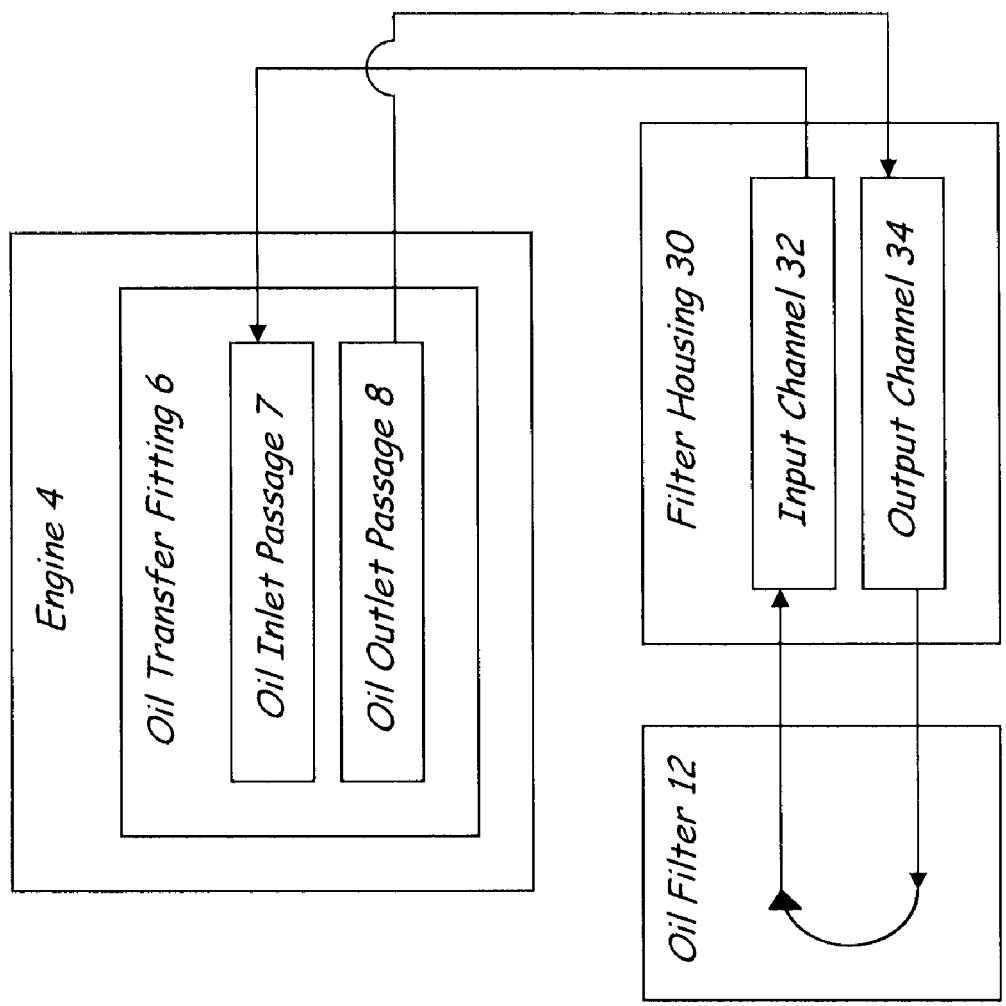
FIG. 7 is a block diagram of elements of the motorcycle, such as the filter housing and oil filter on the engine, prior to implementation of the oil filter relocation kit.

In the oil filtering apparatus of a motorcycle, a filter housing 30 may be mounted to the outer surface of the oil transfer fitting 6 of the engine 4 so as to cover and communicate with the oil inlet passage 7 and the oil outlet passage 8. The filter housing 30 may be an original equipment component of the motorcycle engine 4. FIG. 7 depicts an illustrative arrangement of the original or stock position of the filter housing 30 and oil filter with respect to other elements of the engine 4 when the filter housing is attached to the oil transfer fitting 6, and in some motorcycle applications, is representative of the vertical positioning of the elements depicted therein. The filter housing 30 may have an input 32 and an output 34, each of which define a channel through which fluid may flow. When the filter housing 30 is mounted on the engine 4, and more particularly to the oil transfer fitting 6 of the engine 4, a first end of the input channel 32 is suitably placed in fluid communication with the oil inlet passage 7 of the engine, and a first end of the output channel 34 is placed in fluid communication with the oil outlet passage 8 of the engine 4. The second ends of the input channel 32 and the output channel 34 may interface with an oil filter 12 mounted on the filter housing 30, such that unfiltered oil may be delivered to the filter 12 through the output channel 34 and filtered oil may be returned to the engine 4 from the filter 12 through the input channel 32.

Figure 2:
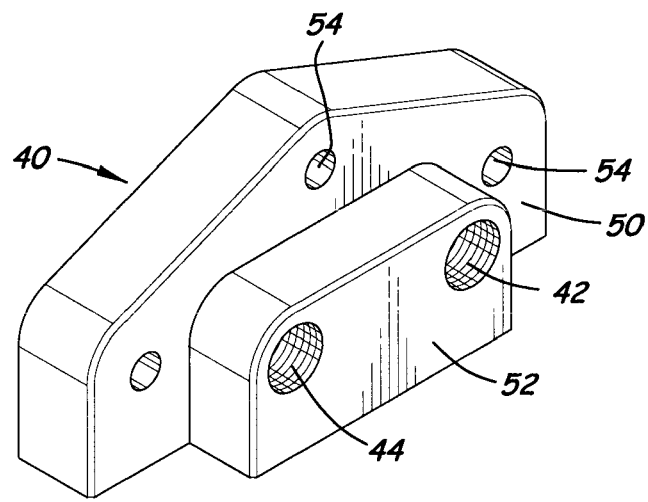
FIG. 2 is a schematic perspective view of the oil block of the present disclosure, particularly showing the conduit engaging surface of the oil block.
Figure 3:
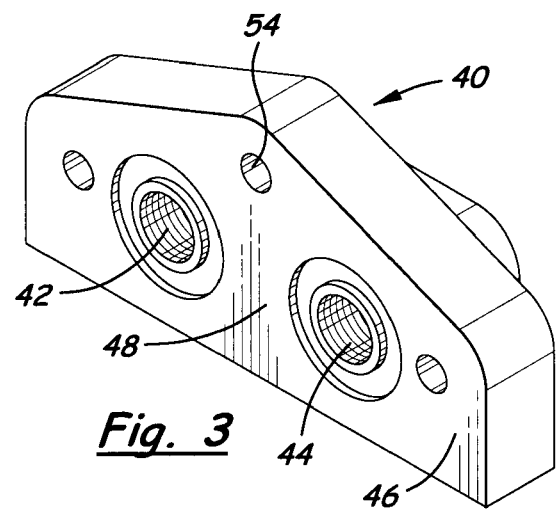
FIG. 3 is a schematic perspective view of the oil block according to the present disclosure, particularly showing the engine engaging portion of the oil block.

The kit 10 may include an oil block 40 that may be attached to the oil transfer fitting 6 of the engine 4 in place of the filter housing 30, after the filter housing 30 has been removed from the engine 4. As shown in FIGS. 2 and 3, the oil block 40 may have an opening defining an input port 42 and an opening defining an output port 44. The input port 42 and the output port 44 may be substantially similar so that the input port 42 could be converted to act as an output port if necessary to connect the oil block 40 to an engine 4. Likewise, the output port 44 may be converted to act as an input port if necessary. The input port 42 of the oil block 40 may be brought into fluid communication with the oil inlet passage 7 of the engine 4 when the oil block 40 is attached to the oil transfer fitting 6 the engine 4. Similarly, the output port 44 of the oil block 40 may be brought into fluid communication with the oil outlet passage 8 of the engine 4 when the oil block 40 is attached to the oil transfer fitting 6 of the engine 4. The oil block 40 may include an engine engaging portion 46 for mounting to and against the outer surface of the oil transfer fitting 6 of the engine 4 at the location of the oil inlet passage 7 and oil outlet passage 8. Illustratively, the engine engaging portion 46 may have an engine engaging surface 48 for placement against the engine 4 adjacent to the oil inlet passage 7 and the oil outlet passage 8. Suitable gasketing may be utilized but will not be further described here. The oil block 40 may further include a conduit engaging portion 50, which is adjacent to, but opposite of, the engine engaging portion 46. The conduit engaging portion 50 may have a conduit engaging surface 52 for receiving and/or engaging conduits. In the illustrative embodiment, the surface area of the engine engaging portion 46 may be greater than the surface area of the conduit engaging surface 50, although this is not critical to the operation of the system. The engine engaging portion 46 may have one or more securing apertures 54 for receiving a fastener to secure the oil block 40 to the oil transfer fitting 6 of the engine 4.

Figure 5:
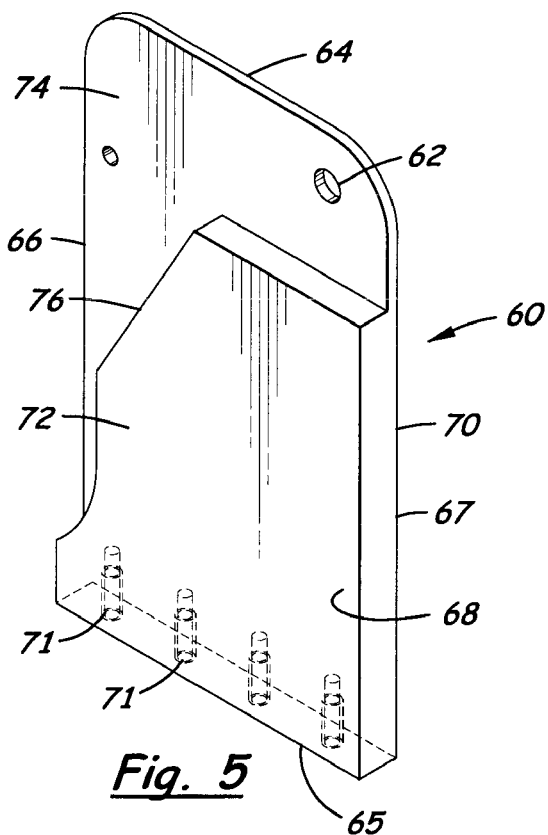
FIG. 5 is a schematic perspective view of the bracket of the present disclosure, particularly showing the frame facing surface of the bracket.
Figure 8:
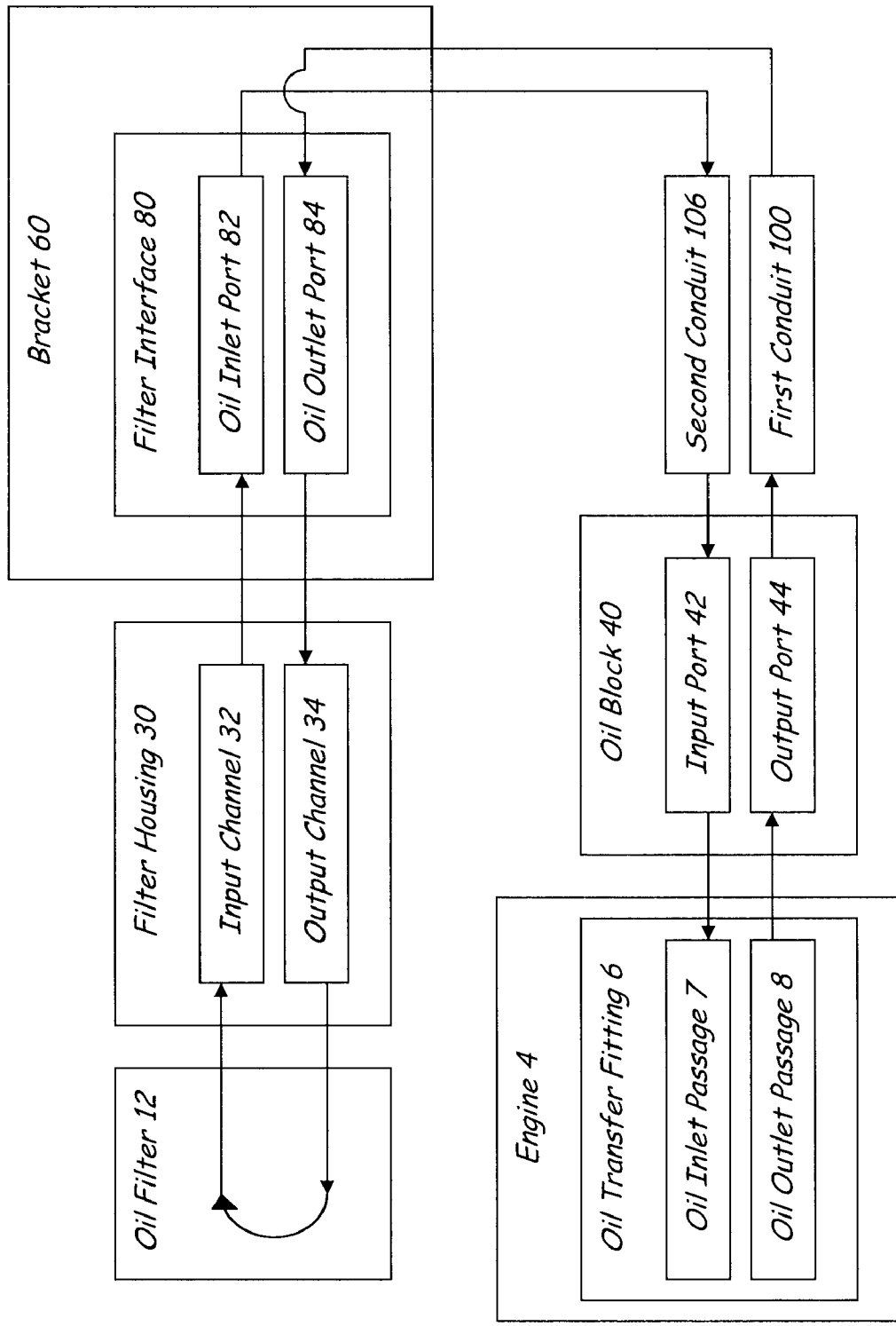
FIG. 8 is a block diagram of the oil filter relocation kit of the present disclosure implemented with the elements of FIG. 7.
Figure 9:
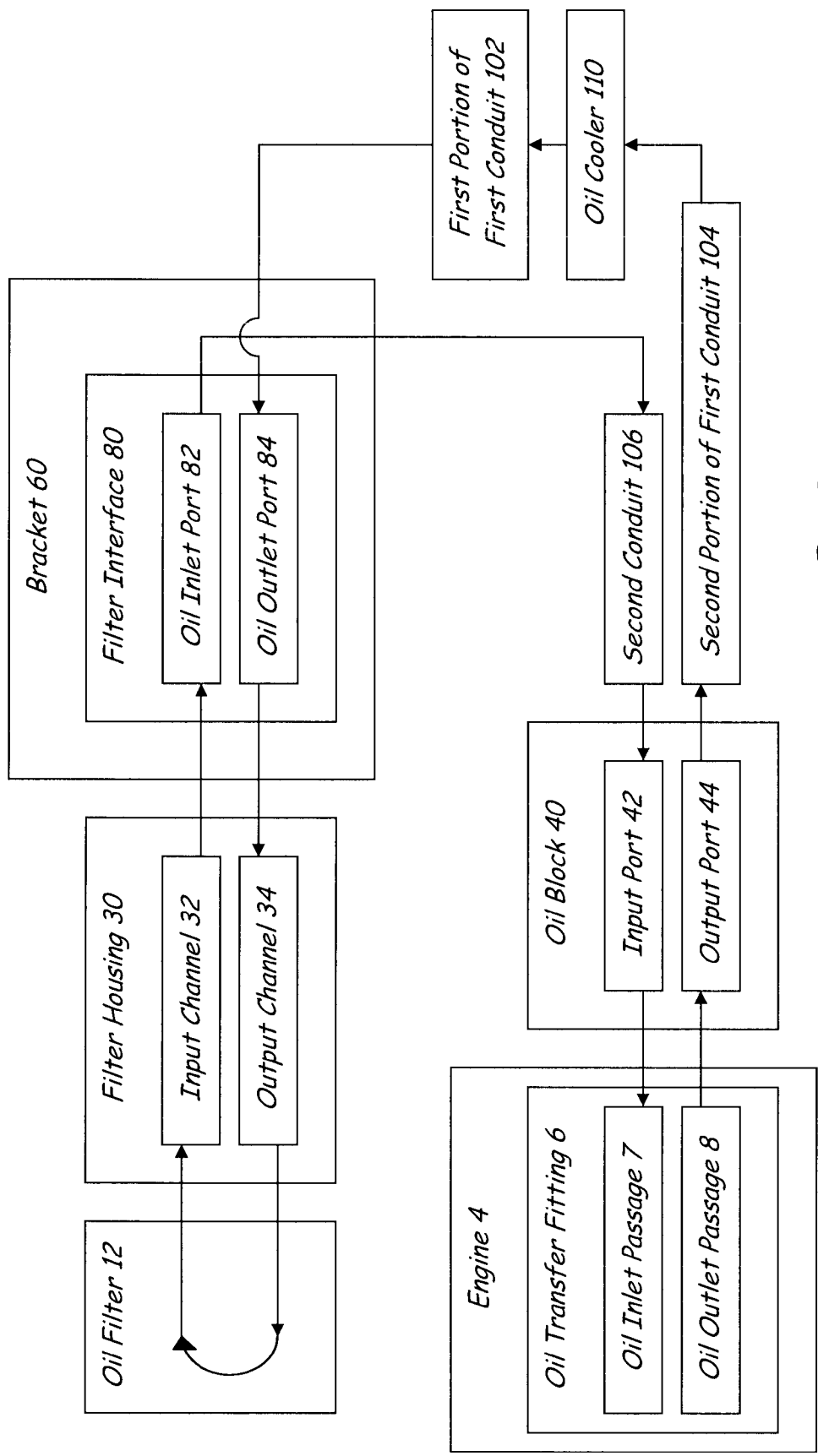
FIG. 9 is a block diagram of the oil filter relocation kit of the present disclosure implemented with the elements of FIG. 7 and an oil cooler.

The kit 10 also may include a bracket 60 for mounting on the frame 20 of the motorcycle 2. The mounting location of the bracket 60 may position the bracket at a vertical height that is substantially equal to or greater than a vertical height of the quantity of oil contained in the engine 4, as shown in FIGS. 5, 8 and 9. One of the primary disadvantages with oil filters located at a vertical height that is not above the oil reservoir or sump, or that is not above the level of oil contained in the engine 4, is that removing the filter from the filter housing 30 tends to release oil through the unobstructed filter housing after this removal. Even by draining oil from the engine 4 prior to removing the oil filter, residual oil may remain in portions of the engine 4 or associated oil conduits that can be released by the removal of the oil filter. Further, a certain quantity of oil is held inside the oil filter at any given time, and that oil typically spills from the filter as the filter is removed from the housing 30. It is beneficial, through the use of the kit 10, to move the filter 12 to a vertical height that is above the level of the oil in the oil reservoir or sump of the engine 4 to reduce the risk of spillage of oil as oil in the engine 4 and associated conduits is not as likely to drain through the unobstructed filter housing 30 when the filter is removed.

The bracket 60 may mount to the second side of the frame 20, corresponding to the right side of the rider in a seated position on the motorcycle 2. In this position, the bracket may be readily accessible to a person located on the second side of the frame when the motorcycle frame is resting against a kickstand. When resting against a kickstand, which is typically located on the first side of a motorcycle frame, the second side of the motorcycle frame 20 tilts upwardly away from the ground surface as the first side of the frame tilts toward the ground surface. In this configuration, the angle of tilt of the frame in relation to the ground surface, when measured from the second side of the frame, is greater than 90 degrees. Components mounted on the second side of the frame are, therefore, more readily accessible when the frame is resting on a kickstand.

Illustratively, the bracket 60 may mount on a seat support frame element 22 of the motorcycle 2, such as may be found on a bagger-style motorcycle. Illustratively, the bracket 60 may mount rearwardly of or behind the engine 4 or below the engine 4. The bracket may be located so that, when a filter housing 30 and associated oil filter 12 are mounted to the bracket 60, the position of the bracket on the motorcycle frame is conducive to facilitate removal and replacement of the filter. Additionally, the bracket may be located so that, when a filter housing 30 and associated oil filter 12 are mounted to the bracket 60, the oil filter 12 does not interfere with an operator or passenger riding on the motorcycle 2. The bracket 60 may include one or more apertures 62 that receive fasteners to secure the bracket 60 to the frame 20. In the illustrative embodiment, the bracket 60 may have a top edge 64, a bottom edge 65, a left edge 66, and a right edge 67, and may have a substantially rectangular shape, but this shape is not critical. The bracket 60 may have two surfaces, including a frame-facing surface 68 and an outward-facing surface 70. When installed on a motorcycle 2, the frame-facing surface 68 of the bracket 60 faces towards the frame 20 of the motorcycle 2 whereas the outward-facing surface 70 of the bracket 60 faces away from the motorcycle 2. The bottom edge 65 of the bracket 60 may include a plurality of accessory apertures 71 for receiving a fastener to fasten other components to the bracket 60 if desired. The accessory apertures 71 may have threads for receiving a threaded fastener. The frame-facing surface 68 may have a primary region 72 and a flange region 74. Additionally, the bracket 60 may have two thicknesses, with one thickness corresponding with the primary region 72 and another thickness corresponding to the flange region 74, such that the thickness of the primary region 72 is greater than the thickness of the flange region 74. The primary region 72 of the frame-facing surface 68 may abut against a side surface of one of the frame elements of the motorcycle frame 20.

In an illustrative embodiment, the primary region 72 of the bracket 60 has a chamfer 76 in one corner so that the bracket 60 can abut against an angled or inclined portion of the motorcycle frame 20 and the upper edge of the bracket 60 may be oriented substantially horizontal. Illustratively, the chamfer 76 of the primary region 72 may abut against an angled portion of the seat support frame element 22. The chamfer 76, along with other modifications in the shape of the primary region 72, may be implemented to conform the primary region 72 of the frame-facing surface 68 to abut against a side surface of one of the frame elements. The flange region 74 of the frame-facing surface 68 may abut against a side surface of one of the frame elements. The bracket 60 may have a height, a width and a thickness where the height is the distance between the top edge 64 and the bottom edge 65, the width is the distance between the left edge 66 and the right edge 68, and the thickness is the distance between the frame-facing surface 68 and the outward-facing surface 70. In an illustrative embodiment, the bracket is between approximately 2.5 inches and approximately 6.5 inches wide, between approximately 5 and approximately 9 inches tall, and between approximately 0.1 inches and approximately 1 inch in thickness.

The kit 10 may also include a filter interface 80 that may be attached to the bracket 60 and to which the filter housing 30 may be mounted. The filter interface 80 may have an oil inlet port 82 that defines an opening for oil to enter the interface 80, and an oil outlet port 84, also defining an opening, for oil to leave the interface 80. The oil inlet port 82 and oil outlet port 84 may convey oil through the filter interface 80 to an attached filter housing 30. The filter interface may have a top side 86, a bottom side 87, a left side 88, a right side 89, a frame-facing surface 90, and an outward-facing surface 91. The filter interface 80 may be substantially rectangular, having a height, a width and a thickness. The width of the filter interface 80 is the distance between the left side 88 and the right side 89 of the device. The height of the filter interface is the distance between the top side 86 and the bottom side 87. Finally, the thickness of the filter interface is the distance between the frame-facing surface 90 and the outward-facing surface 91.

The filter interface 80 may have a locating channel 92 in the top side 86 for receiving a portion of the bracket 60. One or more apertures 92 may be present in the locating channel 92 for receiving a fastener to secure the filter interface 80 to the accessory apertures 71 of the bracket 60. Illustratively, two bracket apertures 94 may be employed, in a spaced apart configuration such that the position of the two apertures 94 matches the position of two of the plurality of accessory apertures 71 located on the bottom edge 65 of the bracket 60. By inserting a fastener through one or both of the bracket apertures 94 located in the filter interface 80, the filter interface 80 can be attached to the bracket 60. The position of the filter interface 80 in relation to the bracket 60 can be selected by choosing any two apertures of the plurality of accessory apertures 71 closest to a desired position. The bottom side 87 of the filter interface 80 may be adapted to receive the filter housing 30 from the engine 4.

The oil inlet port 82 of the filter interface 80 may be in fluid communication with the input of the filter housing 30 and the oil outlet port 84 of the filter interface 80 may be in fluid communication with the output of the filter housing 30. In the illustrative embodiment, the oil inlet port 82 and the oil outlet port 84 extend from the right side 89 of the filter interface 80 to the bottom side 87. A plurality of threaded openings 96 may be formed in the bottom side 87 of the filter interface 80 for receiving a fastening member from a filter housing 30. The openings 96 may be positioned to line up with the fastening member of the filter housing 30 when the filter housing 30 is mounted to the filter interface 80. The filter interface 80 may receive the filter housing 30 from the engine 4, although the filter interface 80 may also receive a different filter housing 30 to accommodate various sizes or shapes of filters. In an optional embodiment, the filter interface 80 may be configured so as to receive or engage an oil filter 12 directly without the need for a filter housing 30.

Figure 6:
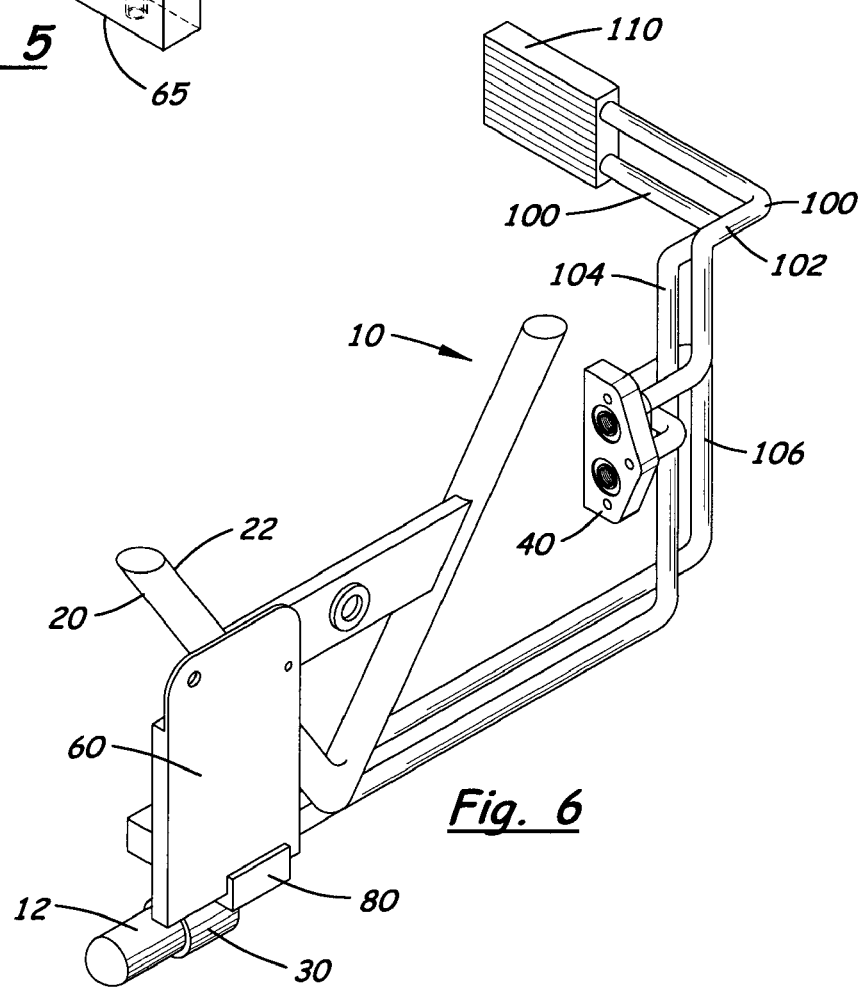
FIG. 6 is a schematic perspective view of the oil filter relocation assembly of the present disclosure shown in an assembled condition as the elements of the kit may be arranged when mounted on a motorcycle (with some parts of the motorcycle frame shown).

As shown in FIGS. 1 and 6, an oil filter 12 may be attached to the filter interface 80 through the filer housing, for receiving unfiltered oil from the engine 4 and outputting filtered oil to the engine 4. The oil filter 12 may have an input in fluid communication with the oil inlet port 82 of the filter interface 80, and an output in fluid communication with the oil outlet port 84 of the filter interface 80.

Figure 4:
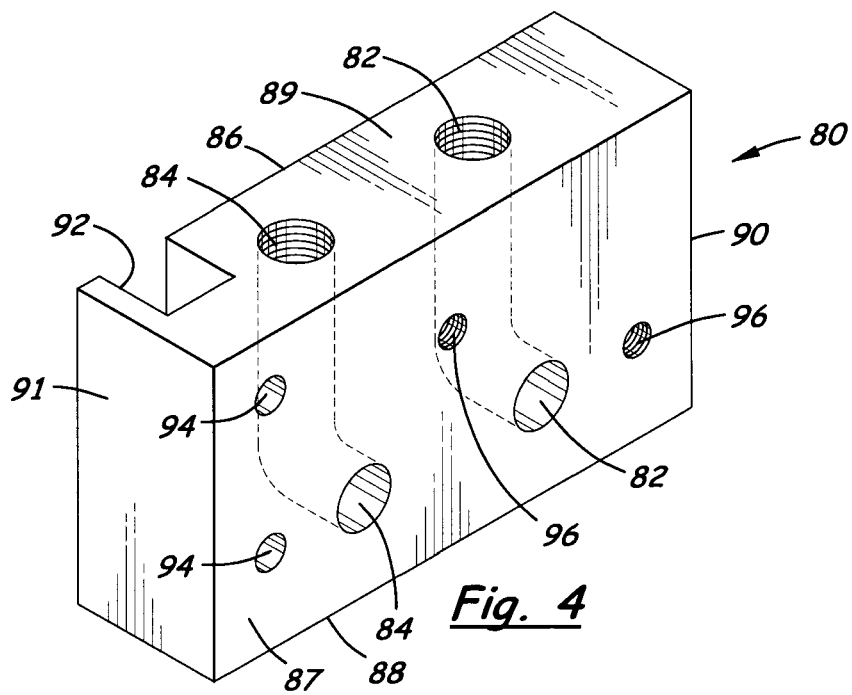
FIG. 4 is a schematic perspective view of the filter interface, according to the present disclosure.

The assembly 10 may include a plurality of fluid conduits for placing the filter interface 80 in fluid communication with the engine 4, as best shown in FIGS. 1, 8 and 9. The plurality of fluid conduits may link the oil block 40 to the filter interface 80, so that unfiltered oil from the engine 4 may travel to the filter 12 through the filter interface, where particulate matter is filtered from the oil. Once filtered, the oil is returned to the engine 4 through the fluid conduits. The plurality of fluid conduits may attach to the ports of the filter interface 80. In order to accommodate the flow of both filtered and unfiltered oil, the plurality of fluid conduits may include a first conduit 100 and a second conduit 106. The first conduit 100 may serve to carry unfiltered oil from the engine 4 to the filter interface 80 and the oil filter 12 mounted thereon, while the second conduit 106 may serve to carry filtered oil from the oil filter 12 through the filter interface back to the engine 4. As illustratively shown in FIG. 8, the first conduit 100 may connect the output port 44 of the oil block 40 to the oil outlet port 84 of the filter interface 80. The second conduit 106 may connect the input port 42 of the oil block 40 to the oil inlet port 82 of the filter interface 80. The first conduit 100 may further include a first portion 102 and a second portion 104, for accommodating various accessories, including an oil cooler 110. In an optional embodiment, shown in FIGS. 1, 6 and 9, the first portion 102 of the first conduit 100 may connect the oil cooler 110 to the oil outlet port 84 of the filter interface 80. The second portion 104 of the first conduit 100 may connect the output port 44 of the oil block 40 to the oil cooler 110. Finally, the second conduit 106 may connect the input port 42 of the oil block 40 to the oil inlet port 82 of the filter interface 80. The filter interface 80 may be in fluid communication with the engine 4, as shown in FIG. 4. Unfiltered oil from the engine 4 may travel through from the engine through the oil outlet passage 8 of the oil transfer fitting 6, through the outlet port 44 of the oil block 40, through the first conduit 100, and through the oil outlet port 84 of the filter interface 80. From the oil outlet port 84, the unfiltered oil may travel through the output channel 34 of the filter housing 30 and finally through an oil filter 12, where the oil is filtered to remove contaminants. Filtered oil from the oil filter 12 may then travel through the input channel 32 of the filter housing 30, and through the oil inlet port 82 of the filter interface 80. From the filter interface 80, the filtered oil may travel through the second conduit 106 and through the input port 42 of the oil block 40. Finally, the filtered oil may travel into the oil inlet passage 7 of the oil transfer fitting 6, where it returns to the engine 4.

Another aspect of the disclosure regards a method of installing an oil filter relocation kit 10 on a motorcycle 2, particularly a bagger-style motorcycle. The method may include an initial step of providing a motorcycle 2 having some or all of the elements described above. In order to prepare the motorcycle 2 for the installation of the kit, the oil filter 12 may be removed if it is mounted to the motorcycle engine 4. The filter housing 30, linking the oil filter 12 to the engine 4, may also be removed. The oil block 40 of the present invention may then be mounted to the oil transfer fitting 6 of the engine 4 such that the oil block 40 is in fluid communication with the oil inlet passage 7 and oil outlet passage 8 of the engine 4. One or more fasteners may be placed through the securing apertures 54 in the oil block 40 in order to secure the oil block 40 to the oil transfer fitting 6 of the engine 4. A bracket 60 may be mounted on the frame 20 of the motorcycle 2 at a vertical height that is substantially equal to or greater than a vertical height of the quantity of oil contained in the engine 4. A filter interface 80 may be attached to the bracket 60. The filter interface 80 may be linked to the oil block 40 in fluid communication using a plurality of fluid conduits for transferring unfiltered oil from the engine 4 to the filter interface 80 and filtered oil from the filter interface 80 to the engine 4. The filter housing 30 that was removed from the engine 4 may be mounted to the filter interface 80. Optionally, an alternative filter housing 30 may be mounted to the filter interface 80, for accommodating filters of various sizes and capacities. Once a filter housing 30 is installed on the filter interface, an oil filter 12 may be installed in the housing.

In order to install an optional oil cooler 110, the oil cooler 110 is first mounted to the frame 20 in a position forward of the engine 4, near the oil block 40. By replacing the filter housing 30 with the oil block 40, sufficient space may be opened up in this area of the frame 20 to accommodate an oil cooler 110. Once mounted to the frame 20, the oil cooler 110 may be connected to the plurality of fluid conduits such that the oil in the conduits passes through the oil cooler 110.

The oil filter relocation kit assembly 10 of the disclosure is highly advantageous for many reasons, including the ability of the assembly 10 to be reposition the oil filter on motorcycles at a vertical height high enough to prevent oil from draining from the filter housing 30 when the oil filter is removed. The ability of the assembly 10 to open up space ahead of the engine 4 of the motorcycle 2, for an oil cooler assembly 110 or other accessory, is also highly advantageous. The disclosure thus provides the operator with an apparatus and method for reducing oil spillage during oil changes and for freeing up space on the frame 20 to permit the installation of accessories that would otherwise not be suitable.

The words "exemplary" and "illustrative" are used herein to mean "serving as an example, instance, or illustration." Any embodiment described herein as "exemplary" or "illustrative" is not necessarily to be construed as preferred or advantageous over other embodiments. Likewise, the term "embodiments of the disclosure" does not require that all embodiments of the disclosure include the discussed feature, advantage or mode of operation.

Aspects of the system of the disclosure are disclosed in the description and related drawings directed to specific embodiments of the disclosure. Alternate embodiments may be devised without departing from the scope of the disclosure. Additionally, well-known elements of the system of the disclosure will not be described in detail or will be omitted so as not to obscure the relevant details of the disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Moreover, in the foregoing Detailed Description, it can be seen that various features are described in the context of a single embodiment for the purpose of streamlining the disclosure. The disclosure of a single embodiment is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Further, where the term "substantially" is used, it is intended to mean "for the most part" or "being largely but not wholly that which is specified".

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An oil filter relocation kit for repositioning an oil filter on a motorcycle having a frame comprising a plurality of frame elements, an engine mounted on the frame, the engine having an oil transfer fitting defining an oil inlet and an oil outlet, the engine having a filter housing for mounting on the oil inlet and the oil outlet of the engine, the filter housing having an input and an output, the kit comprising:

an oil block configured to attach to the oil transfer fitting of the engine in place of the filter housing when the filter housing is removed from the engine, the oil block having an input port and an output port configured to fluidly communicate with the oil inlet and oil outlet of the engine when the oil block is attached to the engine;

a bracket configured to mount on the frame of the motorcycle at a location remote from the oil transfer fitting of the engine;

a filter interface configured to attach to the bracket to thereby support the filter interface on the frame when the bracket is mounted on the frame of the motorcycle, the filter interface configured to have the filter housing mounted thereon, the filter interface having an oil inlet port and an oil outlet port; and a plurality of fluid conduits configured to couple the input port and the output port of the oil block to the oil inlet port and the oil outlet port of the filter interface to place the filter interface in fluid communication with the oil block so that when the oil block is mounted on the oil transfer fitting of the engine and a filter is mounted on the filter interface, the filter is in fluid communication with the engine;

wherein the filter interface is configured to removably attach to the bracket in at least two different positions to permit adjustment of a position of the filter interface and a filter housing mounted thereon with respect to the bracket and the frame when the bracket is mounted on the frame.

2. The kit of claim 1, wherein the filter interface has a channel configured to removably receive a portion of the bracket in the channel in each of the at least two different positions.

3. The kit of claim 1, further comprising the filter housing mounted on the filter interface.

4. The kit of claim 3, further comprising the oil filter mounted on the filter housing for attachment to the filter interface.

5. The kit of claim 1, further comprising an oil cooler configured to be placed in fluid communication with the plurality of fluid conduits so as to be in fluid communication with the engine when the fluid conduits are in fluid communication with the engine.

6. The kit of claim 1, wherein the bracket comprises a frame-facing surface and an outward-facing surface, the bracket having a thickness measured between the frame-facing surface and the outward-facing surface, the bracket having two different thicknesses.

7. The kit of claim 6, wherein the frame-facing surface has a primary region and a flange region, the primary region of the frame-facing surface having a thickness greater than a thickness of the flange region.

8. The kit of claim 1, wherein the filter interface is configured to removably receive the filter housing.

9. The kit of claim 1, wherein the oil block comprises an engine engaging portion and a conduit engaging portion, the engine engaging portion being adjacent to the conduit engaging portion, the engine engaging portion having an engine engaging surface for placement against the engine adjacent to the oil inlet and the oil outlet, the conduit engaging portion having a conduit engaging surface for receiving conduits, the engine engaging surface having a surface area greater than the surface area of the conduit engaging surface, the engine engaging portion having a securing aperture for receiving a fastener to secure the oil block to the engine;

wherein the bracket comprises an aperture for receiving a fastener to secure the bracket to the frame, the bracket having a frame-facing surface for abutting against a rear surface of one of the frame elements and an outward-facing surface, the frame-facing surface having a primary region and a flange region, the primary region of the frame-facing surface having a thickness greater than the flange region, the frame-facing surface having a chamfer for conforming the frame-facing surface to abut against a surface of one of the frame elements;

wherein the filter interface has a channel in the top side for receiving a portion of the bracket, the filter interface having an aperture at the channel for receiving a fastener to secure the filter interface to the bracket, the filter interface having a threaded aperture for receiving a fastener for securing a filter housing to the filter interface, the oil inlet port of the filter interface being configured for fluid communication with the input of the filter housing when the filter housing is mounted on the filter interface and the oil outlet port of the filter interface being configured for fluid communication with the output of the filter housing when the filter housing is mounted on the filter interface;

wherein the plurality of fluid conduits comprise a first conduit and a second conduit, the first conduit comprising a first portion and a second portion, the first conduit for carrying unfiltered oil from the oil block to the filter interface and the second conduit for carrying filtered oil from the filter interface to the oil block; and an oil cooler for cooling oil passing through the oil cooler, the oil cooler being configured to connect between the first portion and the second portion of the first conduit to receive oil flowing through the first conduit between the filter interface and the oil block.

10. The kit of claim 1, wherein a first element of the filter interface and the bracket has a locating channel formed therein with a plurality of apertures in the locating channel, and a second element of the filter interface and the bracket has at least one accessory aperture alignable with at least two different apertures of the plurality of apertures in the first aperture to permit the second element to be attached to the first element in at least two positions.

11. A motorcycle comprising:

a frame comprising a plurality of frame elements, the frame having a first side and a second side;

an engine mounted on the frame, the engine having an oil transfer fitting defining an oil inlet and an oil outlet, the engine defining an oil reservoir in fluid communication with the oil outlet;

an oil block mounted on the oil transfer fitting of the engine such that an output port of the oil block is in fluid communication with the oil outlet of the oil transfer fitting and an input port of the oil block is in fluid communication with the oil inlet of the oil transfer fitting;

a bracket mounted on the frame;

a filter interface mounted the bracket, the filter interface having an oil inlet port and an oil outlet port, wherein the filter interface is configured to removably attach to the bracket in at least two different positions to permit adjustment of a position of the filter interface and a filter housing mounted thereon with respect to the bracket and the frame;

a filter housing mounted on the filter interface in fluid communication with the oil inlet port and oil outlet port, the filter housing being configured to have an oil filter mounted thereon; and a plurality of fluid conduits configured to fluidly connect the oil inlet port and the oil outlet port of the filter interface with the input port and the output port of the oil block so as to provide fluid communication between the filter housing and the oil transfer fitting of the engine.

12. The motorcycle of claim 11, wherein the filter interface is supported by the bracket on the frame at a vertical height that is substantially equal to or higher than a vertical height of the oil reservoir of the engine.

13. The motorcycle of claim 11, wherein the engine contains a quantity of oil in the oil reservoir, the bracket being mounted on the frame at a vertical height that is substantially equal to or greater than a vertical height of the quantity of oil contained in the oil reservoir of the engine.

14. The motorcycle of claim 11, wherein the engine contains a quantity of oil in the oil reservoir, the bracket being mounted on the frame in a manner so that the filter interface supports the filter housing at a vertical height that is substantially equal to or greater than a vertical height of the quantity of oil contained in the oil reservoir of the engine.

15. The motorcycle of claim 11, wherein the bracket has a primary region of the frame-facing surface abutting against a rear surface of one of the frame elements, and a flange region abutting against a side surface of the one frame element.

16. The motorcycle of claim 15, wherein the frame-facing surface has a chamfer conforming the primary region of the frame-facing surface to abut against the one frame element.

17. The motorcycle of claim 11, further comprising an oil cooler in fluid communication with the oil block and the filter interface, the oil cooler being in fluid communication with one conduit of the plurality of fluid conduits.

18. An oil filter relocation kit for repositioning an oil filter on a motorcycle having a frame comprising a plurality of frame elements, an engine mounted on the frame, the engine having an oil transfer fitting defining an oil inlet and an oil outlet, the engine having a filter housing for mounting on the oil inlet and the oil outlet of the engine, the filter housing having an input and an output, the kit comprising:

an oil block configured to attach to the oil transfer fitting of the engine in place of the filter housing when the filter housing is removed from the engine, the oil block having an input port and an output port configured to fluidly communicate with the oil inlet and oil outlet of the engine when the oil block is attached to the engine;

a bracket configured to mount on the frame of the motorcycle at a location remote from the oil transfer fitting of the engine;

a filter interface configured to attach to the bracket to thereby support the filter interface on the frame when the bracket is mounted on the frame of the motorcycle, the filter interface configured to have the filter housing mounted thereon, the filter interface having an oil inlet port and an oil outlet port; and a plurality of fluid conduits configured to couple the input port and the output port of the oil block to the oil inlet port and the oil outlet port of the filter interface to place the filter interface in fluid communication with the oil block so that when the oil block is mounted on the oil transfer fitting of the engine and a filter is mounted on the filter interface, the filter is in fluid communication with the engine;

wherein a first element of the filter interface and the bracket has a locating channel formed therein with a plurality of apertures in the locating channel, and a second element of the filter interface and the bracket has at least one accessory aperture alignable with at least two different apertures of the plurality of apertures in the first aperture to permit the second element to be attached to the first element in at least two positions.

\* \* \* \* \*